United States Patent

Yoshiyasu et al.

[15] 3,660,141

[45] May 2, 1972

[54] PRODUCTION OF FILMS HAVING EXCELLENT ADHESIVENESS TO GELATINS

[72] Inventors: Mitsuo Yoshiyasu; Sadao Saito; Yoshio Miyabe, all of Yokkaichi-shi, Japan

[73] Assignee: Mitsubishi Petrochemical Company Limited, Tokyo-to, Japan

[22] Filed: Dec. 3, 1969

[21] Appl. No.: 881,861

[30] Foreign Application Priority Data

Dec. 10, 1968 Japan....................................43/89932

[52] U.S. Cl.........................117/76 F, 117/83, 117/138.8 E
[51] Int. Cl. .....................................B44d 1/14, B32b 27/08
[58] Field of Search..............117/138.8 E, 161 UB, 161 UC, 117/76 F, 83; 161/254

[56] References Cited

UNITED STATES PATENTS

| | | |
|---|---|---|
| 2,466,038 | 4/1949 | Midwinter et al........................260/41 |
| 2,512,459 | 6/1950 | Hamilton................................260/41 |
| 3,227,605 | 1/1966 | Wolinski..........................117/138.8 E |
| 3,262,808 | 7/1966 | Crooks et al. ....................117/138.8 E |
| 3,405,083 | 10/1968 | Morrison et al.................117/138.8 E |
| 3,483,023 | 12/1969 | Dotson et al. ....................117/138.8 E |
| 3,519,531 | 7/1970 | James et al......................117/138.8 E |
| 3,519,589 | 7/1970 | Lyons..............................117/138.8 E |

*Primary Examiner*—William D. Martin
*Assistant Examiner*—Sadie L. Childs
*Attorney*—Robert E. Burns and Emmanuel J. Lobato

[57] ABSTRACT

A filler-blended polyolefin film is treated with a solution of acrylic ester polymer in a positive solvent which can at least swell the polyolefin, and the film in contact with the solvent in the solution is heated to the temperature of at least 50° C. After removal of the solvent, a film to which gelatins are adhesive is obtained, which film comprises the polyolefin film substrate and a layer of acrylic ester polymer adhering to the substrate.

8 Claims, No Drawings

PRODUCTION OF FILMS HAVING EXCELLENT ADHESIVENESS TO GELATINS

BACKGROUND OF THE INVENTION

The present invention relates to a method for treating a film having surfaces composed of a fine filler-blended polyolefin to obtain a film or a sheet having excellent adhesiveness with respect to gelatins.

Photographic papers are products representative of filmy materials consisting of a filmy base layer and a gelatin layer, coated on the filmy base layer. It is generally known that a photographic paper is made by coating a so-called baryta paper with photographic emulsion (gelatin + silver halogenide) in an amount of 5 to 10g/m², the baryta paper being produced by coating paper made of 100 % of refined chemical pulps with a mixture comprising barium sulfate, gelatin and formalin (hardening agent for the gelatin). The filmy materials so obtained are in wide use as photographic papers since the gelatin used as photographic emulsion constituent is an excellent material for providing good light-sensitivity, and a gelatin layer formed on the basic baryta paper has good adhesiveness with respect to the substrate paper.

However, this photographic paper is not entirely free from disadvantages. That is, the disadvantages of the baryta paper are that it entails high cost in the refining process of its pulp, and the product of manufacture thereof is not homogeneous in quality because of the pulp being a natural product. Furthermore, a serious disadvantage of the photographic paper is a low resistance to water due to the fact that the substrate thereof is a paper.

As one class of the representative examples of filmy materials, plastic films are known, and such films having surfaces rendered appropriately into paper-like form are expected to be used as so-called synthetic papers in the future. In particular, a stretched or drawn or non-stretched or non-drawn film of a fine filler-blended polyolefin, and above all, a laminate comprising said film with any suitable substrate layer (hereinafter, referred to as "a film having a surface consisting of a fine filler-blended polyolefin") is one type of excellent synthetic papers having good printability due to the fine filler blended as well as good properties inherent in polyolefins.

Such a plastic film is water resistant and generally weather-resistant. Therefore, it may be easily conceived that the use of such film in place of paper in photographic papers will provide a water-resistant photographic paper. However, polyolefins in nature are extremely poor in adhesiveness to gelatin. The same is true for a film having a surface composed of a fine filler-blended polyolefin although it possesses satisfactory printability.

As a consequence, there have been proposed various processes for increasing the adhesiveness of plastic films to gelatin through surface treatment. For example, in one process, a polyester film is coated with an epoxy resin, a latex of high content of a gelatin, and then a gelatin emulsion one above the other in sequence. It is, however, obvious that the requirement of such multiple steps is unfavorable.

SUMMARY OF THE INVENTION

It is a principal object of the present invention to solve the aforementioned problems and to imrpove the adhesiveness of polyolefins to gelatins through the use of single step, which may be achieved by applying a coating layer of acrylic ester polymer by a specific process.

Accordingly, the method for producing a film having a good gelatin adhesiveness according to the present invention is characterized by the steps of causing contact between the surface of a film having a surface composed of a fine filler-blended polyolefin and a solution of an acrylic ester polymer in a positive solvent for said polyolefin, heating the film to a temperature of at least 50° C while maintaining the contact condition with the solution, and then removing the solvent present thereon to form a thin layer of the acrylic ester polymer on the surface of the polyolefin.

As can be seen from the foregoing, these are the most important features of the present invention to use a positive solvent for the polyolefin and to use an acrylic ester polymer as a material for the active surface layer with respect to gelatins. The "positive solvent for the polyolefin" herein referred to is a solvent of a character such that it imparts at least swelling action on the polyolefin at the temperature employed (at least 50° C), so that the surface of the polyolefin is caused to be plasticized, swollen, or dissolved as the polyolefin is heat-treated (at a temperature of at least 50° C) under the contact with such solvent. That is, the surface of the polyolefin is excited and the molecular movement of the surface molecules is made active, thereby causing promotion of a physical "entanglement" between said surface molecules and the molecules of the acylic ester polymer which have been brought onto the polyolefin surface while it is dissolved in said positive solvent.

In addition, the acrylate polymer is adsorbed by the filler. Accordingly, an extremely tight contact condition can be achieved between the polyolefin substrate and the acrylate polymer after removal of the solvent, so that the adhesion between the thin layer of the acrylic ester polymer thus produced and the polyolefin substrate is greatly strengthened. Furthermore, the adhesion between the thin layer of the acrylic ester polymer and gelatin is also satisfactory.

Thus, in accordance with the present invention, it has become possible to produce a film having excellent adhesiveness with respect to gelatins in one single step of forming a thin layer of the acrylic ester polymer.

In addition to the advantages inherent in the method per se, the film thus produced has the following advantages in the form of photographic paper over the conventional ones:

1. Shorter washing time

The materials of the film, namely, polyolefins and acrylic ester polymers, are not hydrophilic and accordingly will pick up little or no chemicals during the developing process, so that the duration of washing with water can be greatly reduced to, for example, one-tenth of that required for the conventional photographic paper.

2. Better finish

The film according to the invention which is used as a base film supporting a gelatin layer has a high degree of whiteness, so that better finish is obtainable.

3. Better dimensional stability

The film according to the invention is not hygroscopic or only slightly hygroscopic, so that the photographic paper produced is free from curling, shrinking and elongation, and other defects due to hydroscopicity of the base film supporting the gelatin layer.

DETAILED DESCRIPTION

In expectation of such effects, and as a result of screening of many polymers, it has been found that a raw material for activating surface layers used in the present invention may be an acrylic ester polymer. Suitable acrylic ester polymers include homopolymers of alkyl ester of acrylic acid (the alkyl radicals having one to eight carbon atoms are preferred) or copolymers thereof with a small amount of other monomers such as vinyl acetate, vinyl chloride, acrylic acid or the salts thereof, acrylonitrile, styrene, methacrylic ester, etc. These acrylic ester polymers may also be used in the form of a mixture thereof with a small amount of other polymers compatible with said polymer.

Suitable positive solvents for polyolefin may be selected from those which have the function hereinabove described and the capacity of dissolving the acrylic ester polymer to the required concentration at a temperature of at least 50° C (for example, up to saturation exceeding 0.1 percent by weight, or in particular, 0.5 to 10 percent by weight with respect to the solvent). In general, the preferred solvents for this purpose are non-polar solvents such as those of the aromatic group. By way of example, toluene, xylene, cyclohexane, α-chloronaphthalene, and the like can be used.

A heat treatment under the contact with the acrylic ester polymer solution may be carried out either by carrying out a contact operation with the solution at a temperature exceeding 50° C (for example, immersion of the article to be treated in the acrylic ester polymer solution at a temperature above 50° C), or for example, by applying the heat treatment after completing the contact operation of coating operation with the acrylic ester solution at normal temperature. It is obvious that the period required for the heating must be within a range in which no complete dissolution of the polyolefin to be treated will occur. When swelling spreads into the internal portion of the polyolefin due to excessive long periods of heat treatment, adverse effects on physical properties of the polyolefin material itself, such as a decrease in rigidness, are likely to occur. Therefore, the heat treatment is preferably carried out at a relatively high temperature such as 80° C for a short period of time.

Solvent removal may be carried out by using a separate step or simultaneously with the heating step.

The articles to be subjected to the treatment are films having surfaces composed of the fine filler-loaded polyolefin. These may be drawn or non-drawn films blended with fine filler per se, or laminates formed by superposing the fine filler-blended film on either one or both surfaces of any suitable substrate layer. In particular, a laminate obtained by superposing uniaxially drawn film blended with the fine filler on either one or both surfaces of a biaxially drawn substrate layer is excellent as the substrate in this invention, which laminate is excellent also as synthetic paper (Reference is made to U.S. Pat. application Ser. No. 809,629 filed Mar. 21, 1969.

The polyolefins which can be used in the present invention include a polymer consisting primarily of at least an α-olefin such as as ethylene or propylene, especially a crystalline polymer such as polypropylene, polyethylene, and poly(ethylene-propylene). These polyolefins may also be a mixture of one polyolefin and another polyolefin, or the polyolefin and a small amount of another polymer compatible therewith. The fine fillers to be blended with these polyolefins include a great variety of fillers which are well known as this type of fillers, such as, for example, clay, talc, asbestos, gypsum, barium sulphate, calcium carbonate, magnesium carbonate, titanium oxide, zinc oxide, magnesium oxide, diatomaceous earth, silicon oxide, other inorganic fillers, resin powder, vegetable fiber, and other organic fillers. These fillers may be used independetnly or in the form of combinations thereof.

It is necessary that these fillers be sufficiently fine (for example, about 0.5 to 30 microns in grain size), and it is preferred that these fillers be incorporated into the polyolefin in an amount of 0.5 to 65 percent by weight, preferably 5 to 60 percent by weight. It is naturally to be understood that the polyolefin may contain conventional additives such as stabilizers and coloring agents.

The film thus obtained according to the present invention has good "adhesiveness to gelatin." The active surface layer composed of the thin layer of the acrylic ester polymer has an affinity also for printing, adhesives, etc. Thus, this film has utility in applications other than that for photographic paper. Further, with a photographic paper made of the present film, its non-treated surface may bonded to a page of an album, for example, by means of a conventional adhesive.

"Gelatin" can be any kind of gelatin, and it may contain, if desired, various additives, for example, a hardening agent such as formalin, a photo-sensitive agent such as silver halogenide, a filler and the like.

The film produced according to the present invention can be subjected to any suitable surface treatment (for example, corona discharge treatment), if desired, in order to modify its surface property.

EXAMPLE (1) Example 1.
1. Composition of the substrate to be treated

| | | |
|---|---|---|
| High-density polyethylene (MI=1.0) | 100 | parts (50% by wt.) |
| Low-density polyethylene (MI=3.0) | 20 | parts (10% by wt.) |
| Filler { clay | 60 | parts (30% by wt.) |
| { titanium oxide | 20 | parts (10% by wt.) |
| Lead stearate | 2 | parts (1% by wt.) |

Mixing step

This composition is intimately mixed at a roll temperature of 170° C for 10 to 20 minutes, formed into a sheet, and these after the resulting, material is rendered into a granular material of the desired size.

Molding process

The granular material is formed into a tubular body at a temperature of 270° C by inflation molding procedure. Thereafter the tubular body is cooled by means of a known cooling medium such as air or cooling water and immediately taken up on a winding roll.

The film thus produced may be used as a synthetic paper.

When this film in an actual instance of practice was coated with a solution of gelatin in water and thereafter dried, the gelatin coating was easily stripped off from the film.

2. Treatment according to the present invention

The film thus prepared was treated with a 2% solution of polyacrylic ethyl ester in toluene at a temperature of 90° C for 1 second and thereafter dried thereby to produce a film according to the present invention. This film was then coated with a 3 % solution of a gelatin in water to form a gelatin coating. The gelatin coating thus obtained showed 100 % of adhesiveness by the pressuresensitive adhesive tape test and was not easily stripped off.

The gelatin-coated film which had undergone development process had excellent washability whereby it could be washed satisfactorily with flowing tap water for ten minutes, after which the gelatin layer was free from defects such as peeling, blistering, and cracking. The gelatin layer on the developed gelatin-coated film was also very adhesive, whereby it passed the pressure-sensitive adhesive tape test.

The "pressure-sensitive adhesive tape test" was carried out as follows.

A coated surface was scored by a safety razor blade at intervals of 1 mm laterally and vertically, thereby to cut the coat layer into a plurality of squares each of 1 × 1 mm.

Onto the surface, the number of squares contained therein being $No$, an adhesive surface of a pressure-sensitive adhesive tape was pressed, and then the tape was peeled off.

The number $N$ of the squares of the coat layer which had peeled off and was adhering to the adhesive surface of the tape was counted, and the adhesiveness of the coat was calculated according to the following equation.

Adhesiveness $= (No - N/No) \times 100$ (%)

3. The detailed results are summarized hereinbelow together with other experimental results.

(2) Example 2
1. Composition of the substrate to be treated

| | |
|---|---|
| Crystalline polypropylene (MI–1.0) | 100 parts |
| Diatomaceous earth (Cellite) | 5 parts |
| Titanium oxide | 2 parts |

Mixing and molding step

After mixing the composition at a temperature of 180° C by means of a pair of rolls, the resulting mixture is extruded through an extrusion machine die into a sheet of 0.5 mm thickness. This sheet is quenched with a roll and water bath at a temperature of 10° C, and then the sheet is stretched three times its original dimension in the longitudinal direction at an elevated temperature of 135° C and subsequently five times in the transverse direction at an elevated temperature of 170° C, being thereafter air-cooled to produce a film.

This film in an actual instance of practice showed no gelatin adhesiveness without any further treatment.

2. Treatment according to the present invention

This film was treated with a 2 % solution of polyacrylic methyl ester in xylene at a temperature of 100° C for 5 seconds and thereafter dried to produce a film according to the present invention.

This film was then coated with a 5 % solution of a gelatin in water to form a gelatin coat layer. The gelatin coat layer thus obtained showed 100 percent of adhesiveness by the adhesive tape and was not easily stripped off.

The gelatin-coated film which had photographic additives and had undergone development process had excellent washability with tap water, whereby the pH value of the wash after washing for 7 minutes was 6.8 which was identical to that of the tap water, which indicated that such washing was sufficient. The pH value of the wash after further washing with water for 2 hours was also 6.8, which indicated that washing with water for 7 minutes was sufficient.

The adhesiveness of the gelatin coat of the sample which had been washed with water for 2 hours and then dried was excellent and no impairment of the coat was found.

Only 1 second, instead of 5 seconds, was sufficient for the above described treatment when a corona discharge treatment was carried out thereafter on the coated film.

3. Experiment results

Gelatin adhesiveness was evaluated with the pressure sensitive adhesive tape test. The data obtained represent the adhesiveness on the basis of percentages, which were obtained as a result of the test.

1. Influence of the solvent and temperature

Acrylic ester polymer = Polyacrylic ethyl ester
Treatment period = 5 seconds

| Solvent | | Comp. of the substrate treated | 30°C | 50°C | 75°C | 100°C | 110°C |
|---|---|---|---|---|---|---|---|
| Benzene | Ex. 1 | | 0 % | 20 % | 40 % | — | — |
| | Ex. 2 | | 0 | 30 | 70 | — | — |
| Toluene | Ex. 1 | | 0 | 10 | 30 | 100 | — |
| | Ex. 2 | | 0 | 10 | 40 | 80 | — |
| Xylene | Ex. 1 | | 0 | 5 | 20 | 80 | 100 |
| | Ex. 2 | | 0 | 10 | 20 | 70 | 100 |
| Carbon tetrachloride | Polyacrylic ethyl ester was swollen and floated upward. | | | | | | |
| N-Heptane | not dissolved | | | | | | |
| Tetralin | not dissolved | | | | | | |

2. Influence of the type of acrylic ester polymer

The treatment was carried out with the use of a solution of 2 % of said polymer in xylene at a temperature of 110° C for 5 seconds.

| | Percent | | |
|---|---|---|---|
| Comp. of the substrate treated | Ex. 1 | Ex. 2 | Note |
| Polyacrylic ethyl ester | 100 | 100 | |
| Polyacrylic acid | 0 | 0 | |
| Polymethacrylic methyl ester | 0 | 0 | |
| Polyvinyl acetate | | | Not dissolved. |
| Polyacrylic ethyl/polyacrylic acid=4/1 | 80 | 80 | |

3. Combined effect of the concentration of acrylic ester polymer and corona discharge treatment The substrate treated was the same as that in Ex. 2.

| | Percent | | | | | | |
|---|---|---|---|---|---|---|---|
| | Without corona treatment | | | Corona treatment 20w/m² | | | |
| Treatment period | 1 sec. | 3 sec. | 5 sec. | 1 sec. | 3 sec. | 5 sec. | Note |
| Polyacrylic ethylester:[1] | | | | | | | |
| 0.5% | 5 | 7 | 10 | 5 | 10 | 15 | |
| 2% | 30 | 80 | 100 | 100 | 100 | 100 | |
| 5% | 50 | 70 | 100 | 100 | 100 | 100 | |
| 10% | | | | | | | Coating was difficult because of high viscosity. |
| Temperature:[2] | | | | | | | |
| 90° C | 20 | 50 | 80 | 50 | 100 | 100 | |
| 100° C | 50 | 70 | 100 | 100 | 100 | 100 | |
| 110° C | 100 | 100 | 100 | 100 | 100 | 100 | |

[1] 100° C. xylene solution.  [2] 2% xylene solution.

The substrate treated was the same as that in Ex. 1

| | Percent | | | | | | |
|---|---|---|---|---|---|---|---|
| | Without corona treatment | | | Corona treatment 20w/m² | | | |
| Treatment period | 1 sec. | 3 sec. | 5 sec. | 1 sec. | 3 sec. | 5 sec. | Note |
| Polyacrylic ethylester:[1] | | | | | | | |
| 0.5% | 0 | 0 | 0 | 0 | 0 | 0 | |
| 2% | 100 | 100 | 100 | 100 | 100 | 100 | |
| 5% | 100 | 100 | 100 | 100 | 100 | 100 | |
| 10% | | | | | | | Coating was difficult because of high density. |
| Temperature:[2] | | | | | | | |
| 90° C | 100 | 100 | 100 | 100 | 100 | 100 | |
| 100° C | 100 | 100 | 100 | 100 | 100 | 100 | |

[1] 90° C. toluene solution.  [2] 2% toluene solution.

Reference example

Where no acrylic ester polymer was coated, variations in the type and amount of fillers and admixture of hydrophilic high molecular material or surfactant provided no improvement in gelatin adhesiveness.

| Examination item | Content | Gelatin adhesiveness,[1] percent |
|---|---|---|
| Type of filler (conc. 30%) | Diatomaceous earth (cellite) | 0 |
| | Calcium carbonate | 0 |
| | Talc | 0 |
| | Magnesium oxide | 0 |
| Concentration of filler (diatomaceous earth). | 10% | 0 |
| | 20% | 0 |
| | 30% | 0 |
| | 40% | 0 |
| Admixture of hydrophilic high molecular material. | Ethylene-vinyl, VAc=2% | 0 |
| | Acetate copolymer, VAc=5% | 0 |
| | PVA, 1% | 0 |
| | Melamine, 1% | 0 |
| | Melamine, 5% | 0 |
| Surfactant | Gelatin, 1% | 0 |
| | Gelabin, 5% | 0 |
| | Polythyleneimine, 0.2% | 0 |
| | Alkyltrimethylammonium chloride, 2%. | 0 |
| | Sodium higher-alcohol sulfate, 2%. | 0 |

[1] Adhesive tape test.

We claim:

1. A method for producing a film having a gelatin coat thereon which comprises the steps of (1) contacting a surface of a substrate polyolefin film containing a fine filler of 0.5 to 30 microns in grain size and of 0.5 to 65 percent by weight of the polyolefin with a solution of an acrylic ester polymer in a positive solvent for said polyolefin, (2) heating said surface to a temperature of at least 50° C while maintaining the contact with the solution, (3) removing the solvent present thereon thereby to form a thin layer of the acrylic ester polymer on the surface of the polyolefin, and (4) applying a gelatin coat on the thus formed thin layer of the acrylic ester polymer.

2. A method for producing a film having a gelatin coating thereon as claimed in claim 1 in which said polyolefin is at least one polymer selected from the group consisting of crystalline polypropylenes and polyethylenes.

3. A method for producing a film having a gelatin coating thereon as claimed in claim 1 in which said substrate film has been drawn at least uniaxially.

4. A method for producing a film having a gelatin coating thereon as claimed in claim 1 in which said substrate film is a laminated film comprising a backing film of polyolefin laminated on at least one surface thereof with a coat film composed of a fine filler-blended polyolefin.

5. A method for producing a film having a gelatin coating thereon as claimed in claim 1 in which said acrylic ester polymer is selected from polymers of lower alkyl acrylates.

6. A method for producing a film having a gelatin coating thereon as claimed in claim 1 in which said positive solvent is an aromatic hydrocarbon.

7. A method for producing a film having a gelatin coating thereon as claimed in claim 1 in which said heating is carried out by exposing the surface to the solution at a temperature lower than 50° C and then heating the surface while maintaining the contact condition with the solution to a temperature of at least 50° C.

8. A method for producing a film having a gelatin coating thereon as claimed in claim 1 in which said step of removing the solvent is carried out simultaneously with said step of heating.

* * * * *